No. 726,166. PATENTED APR. 21, 1903.
A. IRONS.
PURSE OR THE LIKE.
APPLICATION FILED JULY 26, 1902.

NO MODEL.

WITNESSES:
Geo. P. Kingsbury
Percy B. Turpin

INVENTOR
Annie Irons.
BY Munn & Co.
ATTORNEYS.

UNITED STATES PATENT OFFICE.

ANNIE IRONS, OF ATTLEBORO, MASSACHUSETTS.

PURSE OR THE LIKE.

SPECIFICATION forming part of Letters Patent No. 726,166, dated April 21, 1903.

Application filed July 26, 1902. Serial No. 117,131. (No model.)

*To all whom it may concern:*

Be it known that I, ANNIE IRONS, a citizen of the United States, residing at Attleboro, in the county of Bristol and State of Massachusetts, have invented a new and useful Chain Fabric, of which the following is a specification.

My invention relates to a fabric made up of finished chains as now made, including the two well-known classes of chains, in one class the links being soldered after or as they are interconnected to form a chain, while in the other class the links are not soldered; and it consists in connecting those finished chains, whether soldered or unsoldered, by connecting-links, which are substantially at right angles to the finished chains and which make meshes, two adjacent finished chains forming two sides of one mesh, which is completed by the connecting-links connecting those two finished chains, the whole forming a fabric made up in one direction by finished chains, but made up in a direction crosswise of the first by connecting-links which connect a link of one finished chain with a link of an adjacent finished chain.

Figure 1:
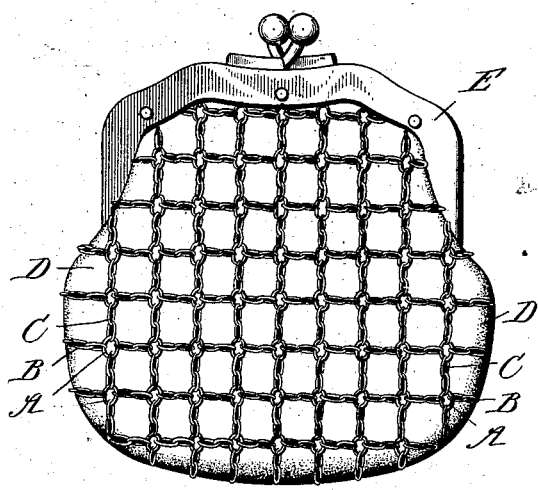
Figure 2:
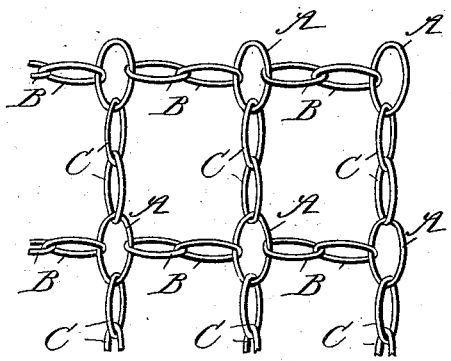

In the drawings, Figure 1 is a side elevation of a purse with a covering of chain fabric embodying my invention. Fig. 2 is a detailed enlarged elevation of a chain fabric made up of a plurality of soldered or unsoldered chains connected by links and embodying my invention.

By my invention I provide a novel fabric made up of finished chains and connecting-links connecting them to form meshes which will possess great flexibility in all directions and which when used as a covering will efficiently brace and reinforce the leather or other material which it covers.

While my invention as shown in Fig. 1 is used as the cover of a purse, it is manifest that it may be made up in belts, fobs, bracelets, or other articles, such as card-cases and the like, and may be used as a covering, as shown in Fig. 1, for square, round, or other-shaped purses. The finished chain, whether with soldered or unsoldered links, may be of gold, silver, plated ware, brass, aluminium, or other metals, as desired.

In the form shown in Figs. 1 and 2 and best illustrated in Fig. 2 the links A are links of the finished chains, and each link A is connected by two connecting-links B to the adjacent link A on one side and by two other connecting-links C to the adjacent link A on the other side, as will be clear from the drawings. By thus providing two connecting-links between each finished chain of which link A is a link and the next adjacent finished chain I provide a meshed chain fabric or chain netting of considerable elasticity, which will readily bend in all directions and yet will preserve the desired pattern, as shown in Fig. 1, and which will operate to strengthen a purse or the like, whose body D is shown in Fig. 1 as inclosed within the chain netting. In the construction shown in Fig. 1 the finished soldered or unsoldered chains of my chain fabric connect with the frame E of the purse and are designed to encircle and inclose the body D and take from such body the strain of the weight of the contents of the purse in this use of my chain fabric.

It will be noticed from Fig. 2 that by providing the two connecting-links B or C between the adjacent uniting-links A greater elasticity is afforded by reason of the joint between the pair of connecting-links B or C, as the case may be. By employing the simple elongated form of link shown the netting is made quite thin and will afford no substantial projecting upon the outer side of any inner body D, as the uniting-links A may lie flat against said body, and the connecting-links will tilt slightly to one side or the other and will project from the body D less than the excess of the said connecting-links.

It will be noticed that by my invention I provide a finished chain pattern of soldered or unsoldered strands of finished chain including a series of parallel rows of links and a second series of parallel rows of links, the rows of the second series crossing the rows of the first series and producing a netting presenting open meshes rectangular in form and bounded by twelve links—namely, four uniting-links at the several corners of the open mesh and connecting-links between the said uniting-links—as best shown in Fig. 2 of the drawings.

Having thus described my invention, what I claim as new, and desire to secure by Letters Patent, is—

1. A chain fabric comprising a plurality of finished chains and links connecting each finished chain with its adjacent finished chain at intervals, all the links of each finished chain being connected in rows, and links A of the finished chains being cross-connected by links B and C, to form meshes of which the finished chains are two sides and the connecting-links are the other two sides, substantially as and for the purposes set forth.

2. A chain fabric comprising finished chains and supplemental links connecting each finished chain with its adjacent chain, each set of supplemental connecting-links being composed of a plurality of interconnecting links, one end link of each set being connected with one link A of one finished chain and the other end link of that set being connected with the link A of the adjacent chain, and each finished chain having a plurality of links between its links A; all substantially as specified to form a fabric with meshes, two of whose sides are formed by the finished chains, and the two other sides by the sets of connecting-links.

ANNIE IRONS.

Witnesses:
CHAS. H. BUFFINGTON,
ALBERT FULLER.